March 4, 1947.  E. A. KOENIG  2,417,000
MEANS FOR SUPPORTING AND CARRYING FILTER ELEMENTS
Filed Nov. 20, 1944  2 Sheets-Sheet 1
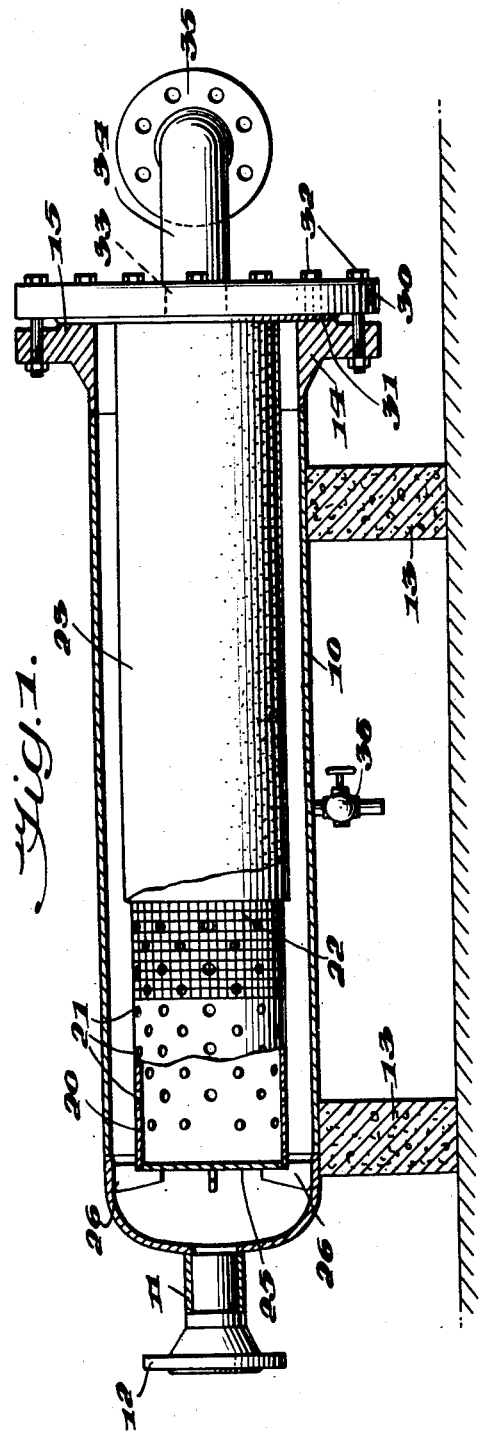
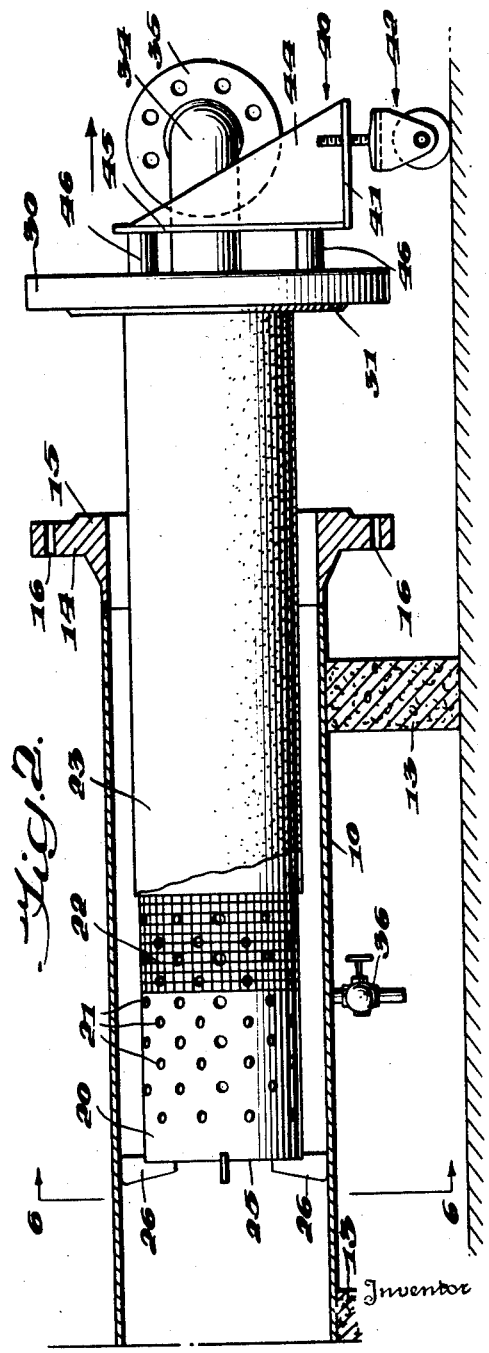
Inventor
Edgar A. Koenig
By Sidney A. Johnson
Attorney March 4, 1947. E. A. KOENIG 2,417,000
MEANS FOR SUPPORTING AND CARRYING FILTER ELEMENTS
Filed Nov. 20, 1944 2 Sheets-Sheet 2
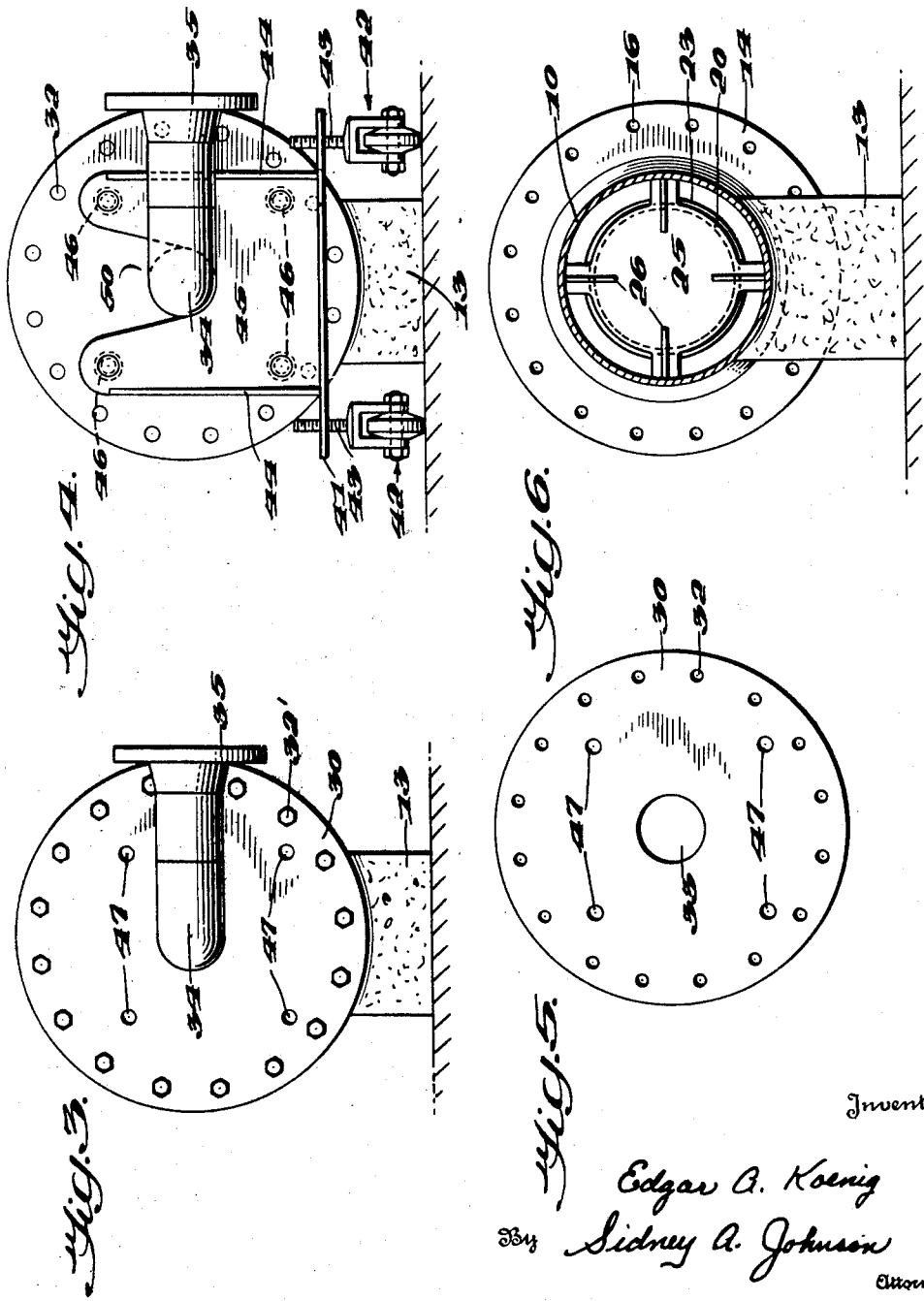

Patented Mar. 4, 1947

2,417,000

UNITED STATES PATENT OFFICE 2,417,000

MEANS FOR SUPPORTING AND CARRYING FILTER ELEMENTS

Edgar A. Koenig, Dallas, Tex., assignor, by mesne assignments, to Socony Vacuum Oil Company, Incorporated, New York, N. Y., a corporation of New York Application November 20, 1944, Serial No. 564,249

11 Claims. (Cl. 210—62)

This invention relates to a fluid filter, and more particularly to the combination of a filter and a carriage for removing the filtering element from its casing, as well as the carriage per se.

More specifically, the invention relates to a filter apparatus used on pipe lines for light non-viscous hydrocarbons such as butane, gasoline, kerosene and the like. The purpose of the filter is to remove mill scale (a form of rust), dirt, etc., from hydrocarbon fluid flowing in the line. Filters are normally installed up-stream in a pipe line apparatus, which apparatus has pumps, metering equipment and the like to protect such equipment from the erosive action of suspended solid particles in the liquid hydrocarbons. Such filters normally comprise a casing which is adapted to be positioned in the pipe line. A filtering element is positioned within the casing and comprises an annular tubing having a plurality of spaced apertures therein and blanket-type felt surrounding the outer periphery of said tubing. The rate of flow of hydrocarbons through each of the filter elements will run from three to five thousand barrels per day. The service time of the filter will, of course, depend upon the amount of foreign matter, sludge, mill scale and the like flowing with the hydrocarbon stream. After a certain amount of usage, the filtering element must be removed from the casing and replaced by a new filtering element, or the used filtering element must be allowed to dry, be cleaned and re-inserted within the casing. As these filtering elements are extremely large and heavy, the problem of removing the filtering element from the casing has been paramount in the industry for a long time. The weight and length of the filtering element is such that, in the usual manner of removing the same from the casing, the felt blanket is often damaged to such an extent that it cannot be re-used. Furthermore, if the removal of the filtering element is not done properly other parts of the filtering element as well as the casing may be damaged beyond repair. This invention deals particularly with solving the problem of removing and replacing elongated heavy filtering elements within the filter casing.

The prime object of this invention is to enable removal and replacement of an elongated filtering element within its casing.

Another object of this invention is to provide a carriage, which carriage, when combined with an elongated filter, enables the filtering element to be removed from the casing without damage.

Another object of the invention is to provide a filtering element which is adapted to be inserted within pipe lines wherein the filtering element may be removed from its casing expeditiously.

Another object of the invention is to provide a carriage for removing the filtering elements from their casing which is simple in operation and constructions.

Other objects and advantages of the invention will be apparent from an inspection of the drawings and the following description.

In the drawings:

Figure 1 is a sectional view of the assembled filter.

Figure 2 is a sectional view of the filter showing the combination of the carriage and the filtering element wherein the filtering element is partially removed from its casing.

Figure 3 is an end view of the filtering element flange and conduit as seen in Figure 1.

Figure 4 is an end view of the filtering element flange, conduit and carriage as shown in Figure 2.

Figure 5 is an end view of the filter flange.

While Figure 6 is a section view taken on line 6—6 of Figure 2.

Referring now to the drawings, reference numeral 10 indicates the filter casing. A suitable inlet conduit 11 is secured to one end of the casing, the conduit 11 is adapted to be bolted to a pipe line by means of flange 12. The casing 10 is suitably supported in a stationary manner on blocks 13, the blocks having a concave upper surface so as to cradle the casing 10. A suitable flange 14 is welded or otherwise secured to the opposite end of the casing 10, the flange 14 having an enlarged annular portion 15 which provides a sealing abutment. The flange 14 is also provided with a plurality of apertures 16, the apertures extending around the periphery of the flange.

A cylinder 20 forms the base of the filtering element, the cylinder 20 being provided with a plurality of spaced perforations 21 therethrough. An expanded metal lathe 22 is placed about the outer periphery of the cylinder 20, and a felt blanket 23 is wrapped over the expanded metal lathe. The blanket 23 may be secured over the lathe in any suitable manner, such as by a plurality of metal hoops (not shown). The metal lathe 22 is inserted between the cylinder 20 and felt blanket 23 so as to space the felt from the cylinder, thus increasing the effective felt surface area.

A solid plate 25 is welded to the cylinder 20 to close one end thereof. The plate 25 is provided with a plurality of fins or studs 26 which extend beyond the periphery of the cylinder 20, the fins 26 being spaced from each other at approximately 45 degree angles. These fins or studs are either formed of brass or are brass coated so that sparks will not be generated when the filter element is being removed from the casing 10. The studs 26 position the inner end of the filter element in axial spaced alignment with the casing 10, and maintain the filtering element in such position when the filtering element is being removed from or inserted into, the casing 10.

The opposite end of the filtering element is provided with a flange 30 which is welded to the cylinder 20 in any suitable manner, the flange 30 being provided with an annular projecting portion 31. A plurality of holes 32 are annularly positioned about the outer portion of the flange 30 so that the flange 30 may be bolted to the flange 14 by means of bolts 32'. The annular portion 31 of flange 30 effects a seal with the annular portion 15 of flange 14, so that when the flanges 14 and 30 are bolted together, an effective fluid seal is obtained. As seen in Figure 5, the filter flange 30 has a centrally located hole 33 therethrough which provides fluid communication with a pipe conduit 34 with the inner portion of the perforated cylinder 20. The conduit 34 is provided with a suitable flange 35 which is adapted to be bolted to a pipe flange, not shown.

The operation of the filter, as seen in Figure 1, will be readily apparent. Fluid, such as liquid hydrocarbons, enter the casing 10 by means of conduit 11, after which the fluid must flow through the felt blanket 23 and then through perforations 21 into the cylinder 20, leaving the filter through the hole 33 in the flange 30 and through conduit 34 into the piping system. A suitable valved sludge drain 36 is provided at the lower portion of casing 10 so as to periodically remove sludge and foreign matter from the casing. However, after long usage the felt blanket 23 becomes saturated with dirt and other foreign matter so that the normally rapid rate of flow through the filter is decreased. When such circumstances take place, it becomes necessary to remove that entire filtering element, including the cylinder 20, felt blanket 23 and all parts secured thereto. In order to accomplish the removal expeditiously, a carriage generally indicated at 40 is provided which will support the outer end of the filtering element in direct alignment with the casing 10 so that the filtering element and associated parts are not damaged by contact with the casing 10 or its flange 14.

Carriage 40 comprises a base 41 mounted on suitable casters, wheels or the like, generally indicated at 42 through screw bolts 43, the screw bolts 43 being threadedly secured through the base 41. Side reinforcing plates 44 are welded or otherwise secured to the carriage 40 in any suitable manner, the side plates 44 being preferably in the form of a triangle with the base of the triangle secured to base 41 of the carriage 40. The purpose of the shape of the side reinforcing members 44 is to provide sufficient space for the conduit 34, so that the carriage 40 in no way interferes with the conduit. A frame 45 extends upwardly from, and at right angles to the base 41 and is reinforced by the side members 44. A plurality of studs 46 extend outwardly from the frame 45 and are rigidly secured to the frame. As seen in Figures 3 and 5, the flange 30 of the filtering element is provided with a plurality of openings 47. The studs 46 are positioned on the frame 45 so as to be in axial alignment with the openings 47 of the flange 30. The frame 45 is provided with a substantially U-shaped open portion 50 adjacent its upper end. Thus, when it is desired to remove the filtering element from the casing, the bolts 32' are removed so as to permit a separation of the flanges 14 and 30. However, before all of the bolts 32' are removed, the carriage 40 is wheeled to the flanged end of the filtering element and the studs 46 are inserted into the openings 47. As aforementioned, the base 41 is vertically adjustable by means of the screw bolts 43 so that the studs 46 may be axially aligned with the openings 47. After the carriage has been suitably positioned, as aforementioned, all of the bolts 32' may be removed and the carriage then supports the outer end of the filtering element in direct axial alignment with the casing 10, thus preventing the filtering element from dropping and damaging the same. Thereafter, the flange 35 may be unbolted from the pipe line, thus freeing the filtering element. The removal of the filtering element is effected by applying an outward force on the flange 30 to move the entire filtering element in the direction of the arrow shown in Figure 2. During the removal of the filtering element the fins or studs 26 secured on the inner end of the cylinder 20 maintain the inner end of the filtering element in axial alignment with the casing 10 so that the removal of the filtering element may be effected without having the same come in contact with the casing.

It will be noted that the outer end of the filtering element is supported, during removal and replacement, not only by the studs 46, but also by means of the open U-shaped portion 50 positioned in the frame 45 which cradles the conduit 34.

After the filtering element has been removed, a new filtering element may be inserted by means of the carriage 40, or, the old filtering element may be permitted to dry, after which it is brushed and thoroughly cleaned and thereafter replaced within its casing. The manner of replacement will, of course, be obvious from the aforementioned disclosure.

I claim:

1. A carriage for movably supporting an elongated filtering element in alignment with a stationary casing, said carriage comprising a horizontally extending base, means connected to the base for rendering said base portable, and a frame secured to and extending substantially vertically upwardly from said base, said frame having an open substantially U-shaped portion adjacent the upper end thereof with the axis of the U-shaped opening substantially corresponding to the substantially vertical axis of said frame for cradling the filtering element.

2. A carriage for movably supporting an elongated filtering element in alignment with a stationary casing, said carriage comprising a substantially horizontally extending base, means connected to the base for rendering said base portable, a frame secured to and extending substantially vertically upwardly from said base, and a plurality of spaced studs extending laterally outwardly from said frame adapted to be inserted within spaced openings in said filtering element, said frame having an open substantially U-shaped portion adjacent the upper end thereof with the axis of the U-shaped opening substantially corresponding to the substantially vertical axis of said frame for cradling the filtering element.

3. A carriage for movably suporting an elongated filtering element in alignment with a stationary casing, said carriage comprising a substantially horizontally extending base, means connected to the base for rendering said base portable, a frame secured to and extending substantially vertically upwardly from said base, said frame having an open substantially U-shaped portion adjacent the upper end thereof with the axis of the U-shaped opening substantially corresponding to the substantially vertical axis of said frame for cradling the filtering element, and a plurality of spaced studs extending laterally outwardly from said frame, some of said studs positioned on said frame relative to said open portion as to be above the bottom of said opening and other studs positioned on said frame below said open portion.

4. A carriage for movably supporting an elongated filtering element in alignment with a stationary casing, said carriage comprising a substantially horizontally extending base, means connected to the base for rendering said base portable, a frame secured to and extending substantially vertically upwardly from said base, a plurality of spaced studs extending laterally outwardly from said frame to be inserted within spaced openings in said filtering element, said frame having an open substantially U-shaped portion adjacent the upper end thereof with the axis of the U-shaped opening substantially corresponding to the vertical axis of said frame for cradling a portion of the filtering element, and means for vertically adjusting said base.

5. In combination; a filter comprising an elongated casing having one of its ends opened, a flange surrounding the open end of said casing, an elongated filtering element adapted to be removably supported in spaced alignment with said casing, a flange secured to the outer end of said filtering element adapted to be secured to said casing flange, a conduit through said filter flange extending outwardly therefrom a support for removing said filtering element from said casing while maintaining said filtering element in alignment with said casing, said support comprising a base, means connected to the base for rendering said base portable, a frame extending upwardly from said base, said frame having a substantially U-shaped open portion therein for cradling said conduit which extends outwardly from said filter flange.

6. In combination; a filter comprising an elongated casing having one of its ends opened, a flange surrounding the open end of said casing, an elongated filtering element adapted to be removably supported in spaced alignment within said casing, a flange secured to the outer end of said filtering element adapted to be secured to said casing flange, a conduit through said filter flange extending outwardly therefrom a support for removing said filtering element from said casing while maintaining said filtering element in alignment with said casing, said support comprising a base, means connected to the base for rendering said base portable, a frame extending upwardly from said base, means on said frame for securing the same to said filter flange, said frame having a substantially U-shaped open portion for cradling said conduit which extends outwardly from said filter flange.

7. In combination; a filter comprising an elongated casing having one of its ends opened, a flange surrounding the open end of said casing, an elongated filtering element adapted to be removably supported in spaced alignment within said casing, a flange secured to the outer end of said filtering element adapted to be secured to said casing flange, a plurality of spaced openings in the outer face of said filter flange a support for removing said filtering element from said casing while maintaining said filtering element in alignment with said casing, said support comprising a base, means connected to the base for rendering said base portable, a frame extending upwardly from said base, a plurality of spaced studs extending outwardly from said frame for entering the openings in said filter flange for securing said filter flange to said support when the filtering element is being removed from the casing.

8. In combination; a filter comprising an elongated casing having one of its ends opened, a flange surrounding the open end of said casing, an elongated filtering element adapted to be removably supported in spaced alignment within said casing, a plurality of circumferentially spaced studs positioned adjacent the inner end of said filtering element adapted to rest upon the inner periphery of said casing for maintaining the inner end of said filtering element in spaced alignment relative to said casing, a flange secured to the outer end of said filtering element adapted to be secured to said casing flange a support for removing said filtering element from said casing while maintaining said filtering element in alignment with said casing, said support comprising a base, means connected to the base for rendering said base portable, a frame extending upwardly from said base, and means on said frame for securing said filter flange to said support when the filtering element is being removed from the casing.

9. In combination; a filter comprising an elongated casing having one of its ends open, a flange surrounding the open end of said casing, an elongated filtering element adapted to be removably supported in spaced alignment within said casing, a plurality of spaced studs positioned adjacent the inner end of said filtering element adapted to rest upon the inner periphery of said casing for maintaining the inner end of said filtering element in spaced alignment relative to said casing, a flange secured to the outer end of said filtering element adapted to be secured to said casing flange, a plurality of spaced openings in the outer face of said filter flange, a conduit through said filter flange extending outwardly therefrom a support for removing said filtering element from said casing while maintaining said filter element in alignment with said casing, said support comprising a base, means connected to the base for rendering said base portable, a frame extending upwardly from said base, a plurality of spaced studs extending outwardly from said frame for entering the openings in said filter flange to support the filter element relative to said casing, and a substantially U-shaped open portion in said frame for cradling said conduit which extends outwardly from said filter flange.

10. In combination; a filter comprising an elongated casing having one of its ends open, a flange surrounding the open end of said casing, an elongated filtering element adapted to be removably supported in spaced alignment within said casing, a flange secured to the outer end of said filtering element adapted to be secured to said casing flange, a plurality of spaced openings in the outer face of said filter flange, a conduit through said filter flange extending outwardly therefrom a support for removing said filtering element from said casing while maintaining said filtering element in alignment with said casing, said support comprising a base, means connected to the base for rendering said base portable, means for vertically adjusting said base, a frame extending upwardly from said base, a plurality of spaced studs extending outwardly from said frame for entering the openings in said filter flange to support the filter element relative to said casing, and a substantially U-shaped open portion in said frame for cradling said conduit which extends outwardly through said filter flange.

11. In combination; a filter comprising an elongated casing having one of its ends open, a flange surrounding the open end of said casing, an elongated filtering element adapted to be removably supported in spaced alignment within said casing, means mounted on and positioned adjacent the inner end of said filtering element adapted to rest upon the inner periphery of said casing for maintaining the inner end of said filtering element in spaced alignment relative to the casing, a flange secured to the outer end of said filtering element adapted to be secured to said casing flange, a plurality of spaced openings in the outer face of said filter flange, a conduit through said filter flange extending outwardly therefrom a support for removing said filtering element from said casing while maintaining said filtering element in alignment with said casing, said support comprising a base, wheels secured to the underside of said base, means for vertically adjusting said base relative to said wheels, a frame extending upwardly from said base, a plurality of spaced studs extending outwardly from said frame for entering the openings in said filter flange to support the filter element relative to said casing, and a substantially U-shaped open portion in said frame for cradling said conduit which extends outwardly through said filter flange.

EDGAR A. KOENIG.

REFERENCES CITED

The following references are of record in the file of this patent:

UNITED STATES PATENTS

| Number | Name | Date |
|---|---|---|
| 1,091,947 | Morgan | Mar. 31, 1914 |
| 864,308 | Kelly | Aug. 27, 1907 |
| 1,015,960 | Kelly | Jan. 30, 1912 |
| 1,158,056 | Kelly | Oct. 26, 1915 |
| 2,166,609 | Putnam | July 18, 1939 |
| 1,479,351 | Winterbottom | Jan. 1, 1924 |
| 1,930,078 | Bentley et al. | Oct. 10, 1933 |
| 2,257,546 | Dienenthal et al. | Sept. 30, 1941 |
| 2,348,925 | Reichhelm | May 16, 1944 |

FOREIGN PATENTS

| Number | Country | Date |
|---|---|---|
| 39,347 | Swedish | Sept. 1, 1915 |